Patented May 11, 1943

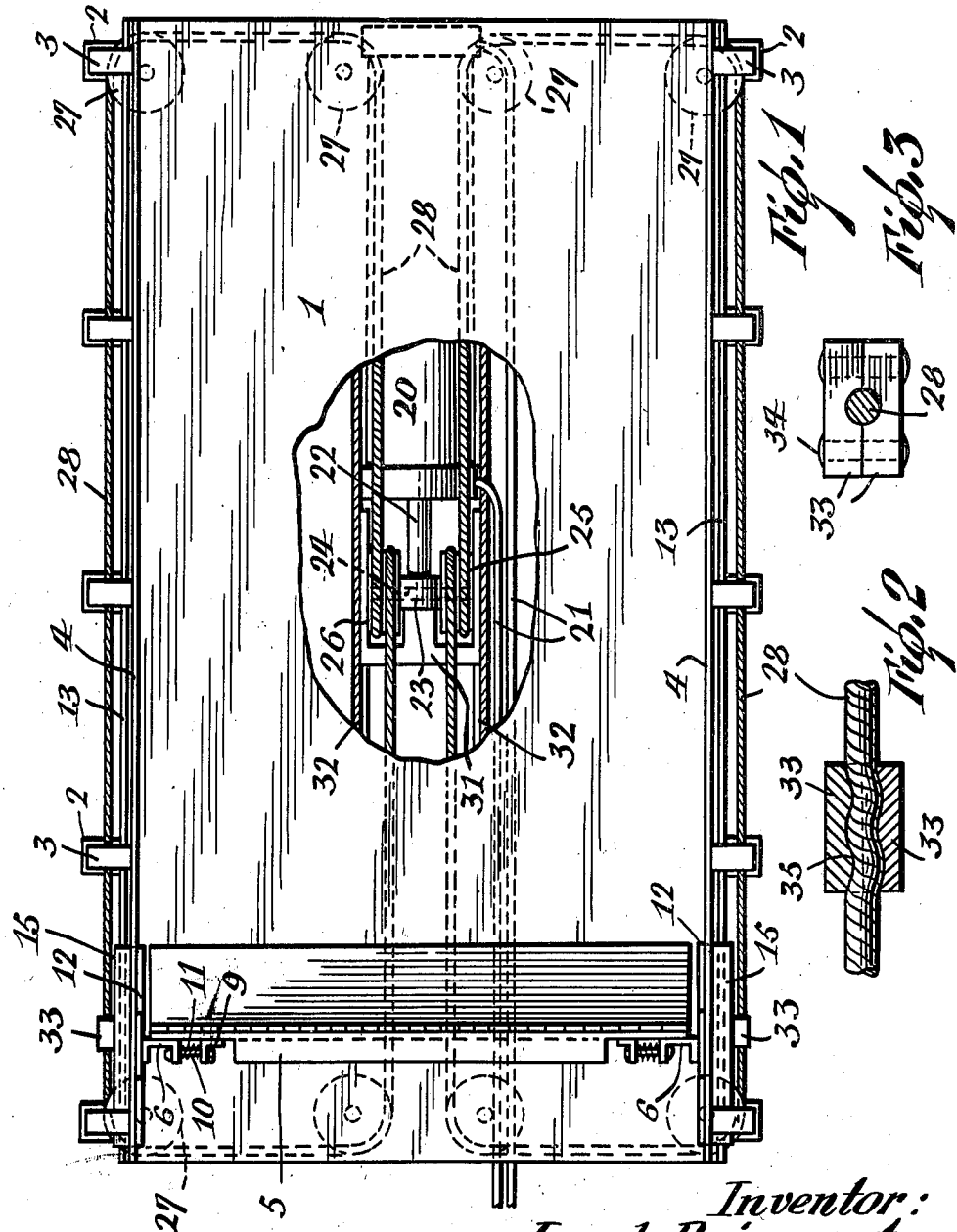

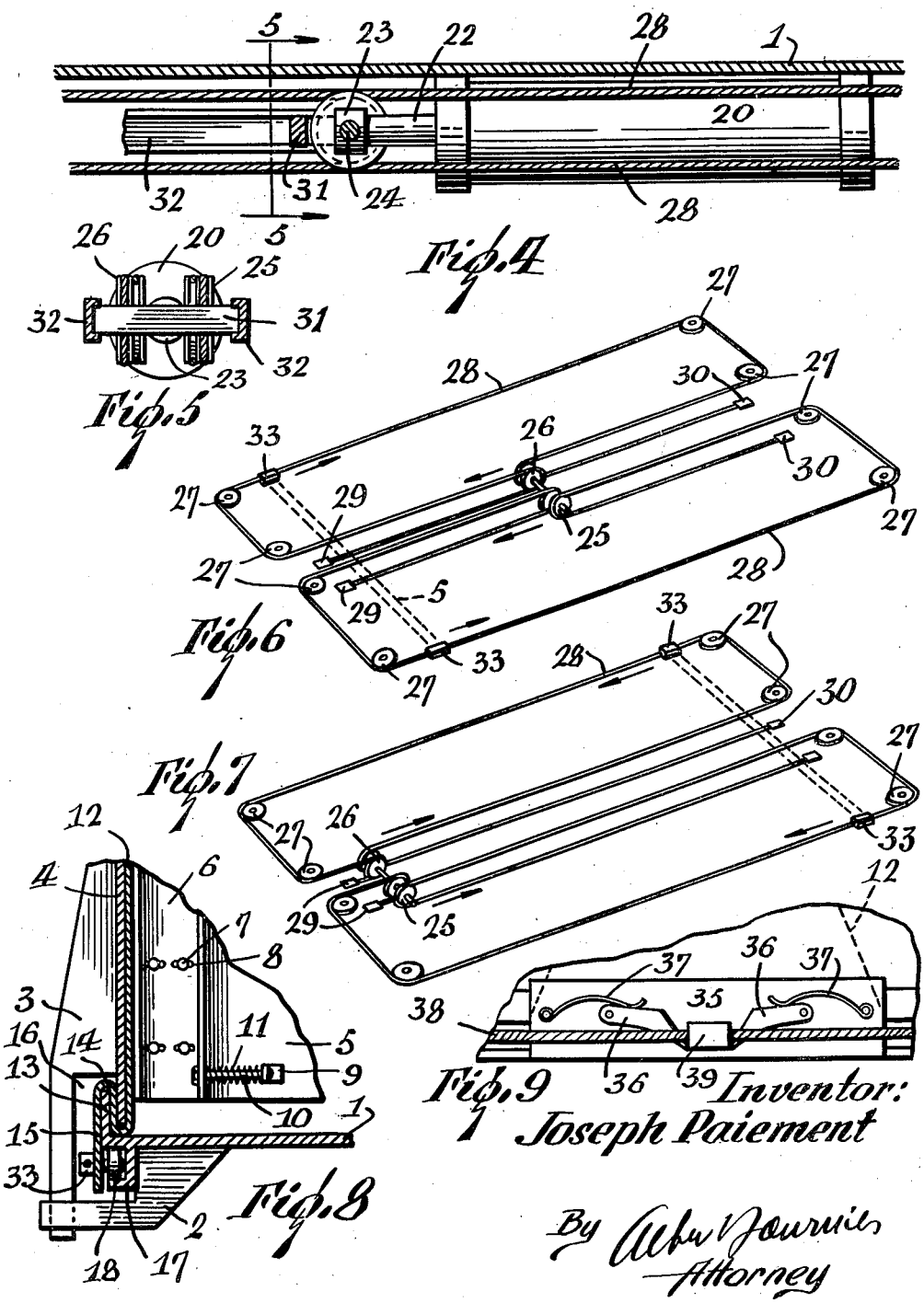

2,318,886

UNITED STATES PATENT OFFICE 2,318,886

LOADING AND UNLOADING MECHANISM FOR TRUCKS

Joseph Paiement, Pointe-Claire, Quebec, Canada

Application November 23, 1942, Serial No. 466,590

5 Claims. (Cl. 214—82)

The present invention pertains to a novel loading and unloading mechanism for trucks and embodies improvements on my United States Patent No. 2,218,121 of October 15, 1940, and Canadian Patent No. 383,644 of August 29, 1939.

One of the objects is to move a transverse wall lengthwise over the floor or platform of the truck by an improved and simplified method. This mechanism comprises a system of pulleys over which is passed a cable having its ends fixed to the truck and having an intermediate lengthwise portion fixed to the wall. The cable is propelled hydraulically by means of a piston rod having a piston received in a cylinder mounted lengthwise of the vehicle. The rod also carries pulleys, and cable is doubled over one of the pulleys, whereby the distance travelled by the cable and wall is double that travelled by the piston rod in a given time. Consequently, the cylinder need be only half as long as the distance to be travelled by the wall from one end of the vehicle to the other.

Another result of this arrangement is that the wall cannot override its limits in either direction through inadvertence of the operator, inasmuch as the movement is automatically arrested when the piston reaches either end of the cylinder.

The cable is preferably laid out in a dual system with each cable attached to one end of the sliding wall assembly. The invention also includes a unique track and rolling support for the wall. This will appear as the description proceeds.

The invention is fully disclosed by way of example in the following description and in the accompanying drawings in which:

Figure 1 is a plan section showing the floor or platform of the truck in elevation and broken away to illustrate other parts;

Figure 2 is a detail section illustrating the anchoring means for the cable;

Figure 3 is an end view thereof;

Figure 4 is a longitudinal vertical section of the actuating mechanism;

Figure 5 is a section on the line 5—5 of Figure 4;

Figure 6 is a diagrammatic view illustrating the cable system, corresponding to the position of parts with the propelled member at one end of the truck;

Figure 7 is a similar view illustrating the position of the parts when the propelled member is at the other end of the truck;

Figure 8 is a detail vertical section; and

Figure 9 is a detail section of a modified construction.

Reference to these views will now be made by use of like characters which are employed to designate corresponding parts throughout.

In Figures 1, 2 and 3, the floor or platform of the truck is designated by the numeral 1. Along the edges are secured brackets 2 extending laterally outward in order to receive uprights 3, as shown more clearly in Figure 8.

The lateral walls 4 of the truck are suitably attached to these uprights. Inasmuch as the remainder of the truck itself is of conventional construction, no further detailed description thereof is considered necessary.

A transverse wall 5 is mounted in a manner to be propelled lengthwise of the platform 1 in order to discharge a load or, in some cases, to draw the load upon the truck. At each vertical edge of the wall 5 is mounted an overlapping adjustable member 6 preferably of the nature of I-beam by means of suitable headed members 7 passing through horizontal slots 8 in the member. Inward of each such member, suitable brackets 9 are fixed to the member 55. A bolt 10 is passed through each bracket and through the adjacent member 6, and a coil spring 11 around the bolt forces the corresponding member 6 outwardly. In this manner the width of the sliding wall 5 is adjustable for various installations and also self-adjusting to irregularities in the space between the opposite lateral walls 5. To the outer side of each member 6 is fastened a triangular vertical plate 12 in surface contact with the adjacent walls 4.

Each longitudinal edge of the platform 1 has an upwardly extending flange 13 as shown more clearly in Figure 8. The lower end of the plate 12 extends beneath the adjacent or corresponding wall 4 and is bent upwardly and over the flange at 14 and then downwardly at 15 to some distance below the platform. Each upright 3 has a cavity 16 to accommodate these parts, and the bracket 2 is also suitably shaped for the purpose.

Within the bracket 2, a track 17 is suspended from the platform 1 and extends lengthwise of the platform along both edges. The downwardly extending portion 15 of the plate 12 carries one or more rollers 18 riding on the track. Thus, it will be seen that the wall member 5 is adapted to ride lengthwise on the platform, and the means for effecting this movement will now be described.

Beneath the platform, and preferably in the longitudinal axis thereof, is mounted a cylinder 20 extending about half the length of the platform. Two pipes 21 extend respectively to opposite ends of the cylinder for conveying a motive fluid thereto. The source of the fluid and the valves for controlling the flow in the pipes may be conventional and therefore is not illustrated.

The cylinder contains a piston (not shown) from which extends a piston rod 22 beyond one end of the cylinder. The outer end of the piston rod carries a block 23 through which is passed a transverse shaft 24. Each end of the shaft carries two pulleys 25 and 26 loosely mounted thereon.

At each side of the axis of the cylinder 20 are four pulleys 27 forming a rectangle, as shown in Figs. 6 and 7. These pulleys are preferably suspended from the platform and lie on vertical axes. A cable 28 is trained over each set of pulleys and passed respectively over the corresponding pulleys 25 and 26. After passing over the last named pulleys the cable has its ends attached to two fixed points designated by the numerals 29 and 30. These points may also be on the platform 1. The piston rod 22 may carry another transverse block 31 having its ends received in longitudinal channels 32, as shown in Figures 4 and 5, for maintaining the piston rod in a straight-line path.

Each of the cables 28 is fixed to the sliding wall assembly by the means shown in Figures 2, 3 and 8. A pair of blocks 33 are clamped around the cable by bolts or rivets 34. The cavity 35 receiving the cable preferably has a sinuous form for more secure clamping. Each such clamp is suitably attached to a downwardly extending portion 15 of a plate 12, as shown in Figure 8.

On movement of the piston rod by means previously mentioned, any point on the cable travels twice the distance of the piston rod in a given time because of the fact that the cable is doubled over the pulleys. This relation would occur with ony one pulley for movement in only one direction. The provision of two pulleys 25 and 26, with the cable passed over both in opposite directions, provides for movement in both directions. The walls 5 may travel the entire length of the platform by movement of the piston rod a distance equal to half the length of the platform.

Figure 9 illustrates a detail of the selective actuating mechanism for one of such walls, the mechanism being identical for both walls. Each such wall 35 carries a pair of spaced and oppositely disposed pivoted levers 36 held in a downward position by springs 37 bearing thereon. The cable 38 has a block 39 clamped thereon in the manner previously described. The block, in approaching a pair of levers, is adapted to ride under and lift the first lever but will be stopped by the second lever, whereupon the first lever will return to its previous position. The block is then in position to propel the sliding wall to which these levers are attached. In order to release the block from this wall, the operator lifts the proper lever 36 with a tool or by hand whereupon the continued movement of the cable brings the block into locking engagement with the levers of the other wall member in the manner described. By means of the selecting mechanism, which operates on both pairs of levers independently, the operator is able to propel either wall member as desired.

It will now be evident that the invention reduces the actuating mechanism to a comparatively simple form. Further, as distinguished from a drum-wound cable, the instant mechanism cannot propel the sliding wall beyond its limits, with consequent damage to the parts. The movement is automatically terminated when the piston reaches either end of the cylinder.

Although specific embodiments of the invention have been disclosed it may be understood that various alterations may be made without departing from the scope of the invention, as indicated by the appended claims.

What I claim as my invention is:

1. A loading device comprising, in combination with the floor of a vehicle, a vertical flange extending upwardly from each longitudinal side of said floor, a transverse wall mounted on said floor and having a part bent upwardly along one side of each flange and having a downwardly extending portion along the other side of each flange, a track suspended from each longitudinal edge of the floor, a roller on each of such portions and riding in the adjacent track, a cylinder mounted lengthwise of said vehicle, a piston rod extending from said cylinder, means for actuating said rod, a pair of pulleys carried by said rod, two sets of pulleys carried by said rod, two sets of pulleys carried by said vehicle respectively at opposite sides of said cylinder, a cable passed over each of said sets and passed over one of the first named pulleys respectively in opposite directions, each cable having its ends fixed to said vehicle and having a portion extending lengthwise of said vehicle and fastened to one of said portions.

2. A loading device comprising, in combination with the floor of a vehicle, a vertical flange extending upwardly from each longitudinal edge of said floor, a transverse wall mounted on said floor and having a part bent upwardly along one side of each flange and having a downwardly extending portion along the other side of each flange, a track suspended from each longitudinal edge of the floor, a roller on each of such portions and riding in the adjacent track, a cylinder mounted lengthwise of said vehicle, a piston rod extending from said cylinder, means for actuating said rod, two pairs of pulleys carried by said rod, two sets of pulleys carried by said vehicle respectively at opposite sides of said cylinder, a cable passed over each of said sets and doubled over one of said pairs of pulleys, respectively in opposite directions, each cable having a portion extending lengthwise of said vehicle and fastened to one of said portions.

3. A loading device comprising, in combination with the floor of a vehicle, a transverse wall mounted on said floor to move lengthwise thereof, a cylinder mounted lengthwise of said vehicle, a piston rod extending from said cylinder, means for actuating said rod, a pulley carried by said rod, a pair of pulleys carried by said vehicle, a cable passed over the last named pulleys and doubled over the first named pulley, said cable having its ends fixed to said vehicle and having a portion extending lengthwise of the vehicle and a block having a sinuous cavity receiving said portion of the cable and clamped thereto, said block being fastened to said wall.

4. A loading device comprising, in combination with the floor of a vehicle, a vertical flange extending upwardly from each longitudinal side of said floor, a transverse wall mounted on said floor and having a part bent upwardly along one side of each flange and having a downwardly extending portion along the other side of each flange, a track suspended from each longitudinal edge of the floor, a roller on each of such portions and riding in the adjacent track, a cylinder mounted lengthwise of said vehicle, a piston rod extending from said cylinder, means for actuating said rod, a pair of pulleys carried by said rod, two sets of pulleys carried by said vehicle respectively at opposite side of said cylinder, a cable passed over each of said sets and passed over one of the first named pulleys respectively in opposite directions, each cable having its ends fixed to said vehicles and having a portion extending lengthwise of said vehicle, and blocks clamped on said portions of said cables and fastened to said portions of said wall.

5. A loading device comprising, in combination with the floor of a vehicle, a transverse wall mounted on said floor to move lengthwise thereof, a cylinder mounted lengthwise of said vehicle, a piston rod extending from said cylinder, means for actuating said rod, a pulley carried by said rod, a pair of pulleys carried by said vehicle, a cable passed over the last named pulleys and doubled over the first named pulley, said cable having its ends fixed to said vehicle and having a portion extending lengthwise of the vehicle and means fastening said portion of said cable to said wall.

JOSEPH PAIEMENT.